United States Patent
DiAdamo et al.

(10) Patent No.: US 12,238,208 B2
(45) Date of Patent: Feb. 25, 2025

(54) PACKET-SWITCHING QUANTUM KEY DISTRIBUTION

(71) Applicant: Cisco Technology, Inc., San Jose, CA (US)

(72) Inventors: Stephen Magno DiAdamo, Munich (DE); Alireza Shabani, Los Angeles, CA (US); Bing Qi, Knoxville, TN (US); Reem M. Mandil, Toronto (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 184 days.

(21) Appl. No.: 18/175,807

(22) Filed: Feb. 28, 2023

(65) Prior Publication Data
US 2024/0291641 A1 Aug. 29, 2024

(51) Int. Cl.
*H04L 9/08* (2006.01)

(52) U.S. Cl.
CPC .......... *H04L 9/0855* (2013.01); *H04L 9/0858* (2013.01)

(58) Field of Classification Search
CPC ..................... H04L 9/0855; H04L 9/0858
See application file for complete search history.

(56) References Cited

U.S. PATENT DOCUMENTS

| | | | |
|---|---|---|---|
| 2016/0218867 A1* | 7/2016 | Nordholt | H04L 9/0852 |
| 2017/0230174 A1* | 8/2017 | Choi | H04L 9/12 |
| 2021/0091935 A1 | 3/2021 | Bush | |
| 2021/0273792 A1 | 9/2021 | Coady et al. | |
| 2022/0311603 A1* | 9/2022 | Szczepanik | H04L 9/14 |
| 2023/0385683 A1* | 11/2023 | Yoo | G06N 10/20 |

OTHER PUBLICATIONS

Diadamo, et al., "Packet Switching in Quantum Networks: A Path to Quantum Internet," https://arxiv.org/abs/2205.07507, May 16, 2022, 14 pages.
Mehic, et al., "A Novel Approach to Quality of Service Provisioning in Trusted Relay Quantum Key Distribution Networks," Journal of Latex Class Files, vol. 14, No. 8, Aug. 2015, 15 pages.
Dynes, et al., "Cambridge quantum network," npj | Quantum Information 5, Article No. 101, Nov. 2019, 8 pages.
Toliver, et al., "Demonstration of 1550 nm QKD with ROADM-based DWDM Networking and the Impact of Fiber FWM," 2007 Conference on Lasers and Electro-Optics (CLEO), May 2007, 2 pages.

* cited by examiner

*Primary Examiner* — Normin Abedin
(74) *Attorney, Agent, or Firm* — Edell, Shapiro & Finnan, LLC

(57) ABSTRACT

A network element in a quantum network receives a hybrid frame including a classical header and a quantum payload. The network element processes the classical header for a length of time and generates a new classical header. The network element drops a portion of the quantum payload based on the length of time spent processing the classical header and updates the hybrid frame to include the new classical header and the quantum payload without the dropped portion.

20 Claims, 7 Drawing Sheets

PACKET-SWITCHING QUANTUM KEY DISTRIBUTION

TECHNICAL FIELD

The present disclosure relates to quantum computing and quantum network communication, specifically Quantum Key Distribution (QKD).

BACKGROUND

Packet-switching enables scalability in networking by removing the reservation of network resources during a communication session. In a quantum entanglement-based networking environment, network resources are reserved for each network element in the path between the source endpoint and the destination endpoint until the data qubits have been transferred to the destination endpoint.

Quantum Key Distribution (QKD) is a relatively mature quantum technology that provides a cryptographic key distribution protocol with proven security against quantum adversaries. Typical QKD implementations are purpose-built quantum communication system that are built in parallel with classical communication systems. Classical optical communication systems typically employ high intensity laser pulses, and QKD system operate at the single-photon level.

DETAILED DESCRIPTION

Overview

A method is provided for packet-switched QKD. The method includes receiving a hybrid frame at a router in a quantum network, The hybrid frame includes a classical header and a quantum payload. The method also includes processing the classical header for a length of time and generating a new classical header. The method further includes dropping a portion of the quantum payload based on the length of time spent processing the classical header and updating the hybrid frame to include the new classical header and the quantum payload without the dropped portion.

Example Embodiments

The techniques presented herein include a network that delivers secure quantum keys to endpoints through packet switching, rather than point-to-point connections of circuit switching. Packet switching enables the scalability to provide secure cryptographic keys between users as the number of network users increases. The network elements (e.g., routers and switches) in the network may be updated with hardware and control systems that allow for the optimization and improvement of a Quantum Key Distribution (QKD) system.

Figure 1:
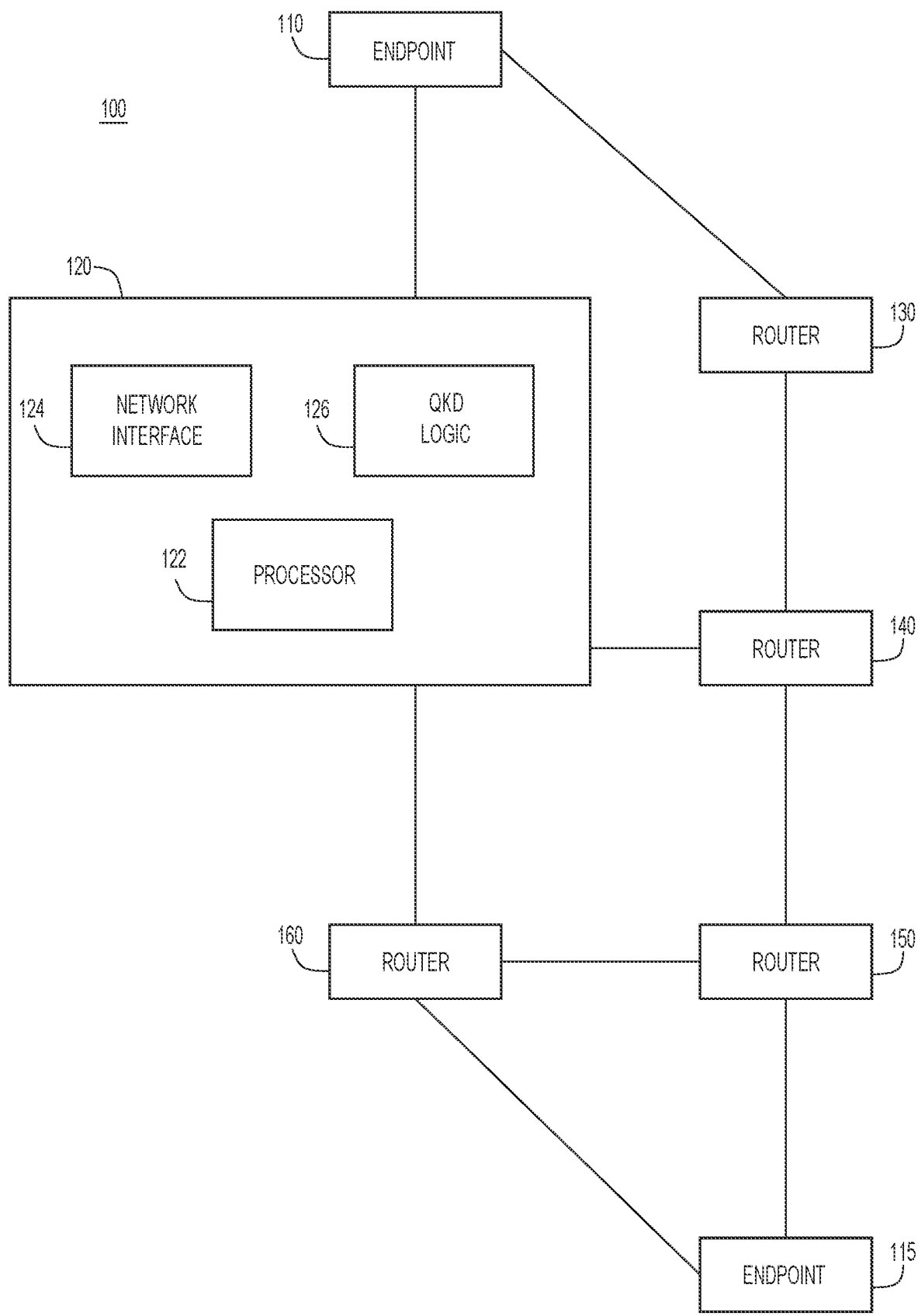
FIG. 1 is simplified block diagram of a packet-switched hybrid quantum/classical network system configured for Quantum Key Distribution (QKD) between endpoints, according to an example embodiment.

Referring now to FIG. 1, a quantum network system 100 that may be optimized for sharing secure key material (e.g., through QKD) between an endpoint 110 and an endpoint 115. The endpoint 110 is connected to a network element, such as a router 120) that is configured to direct packets through the network system 100. In one example, the packets may be optical frames that include both classical information (e.g., in a header) and quantum information (e.g., as a payload). Hereinafter, the messages that pass through the network system 100 may be referred to as packets, hybrid packets, frames, or hybrid frames, interchangeably.

The router 120 includes a processor 122, a network interface 124, and QKD logic 126. The processor 122 is configured to read, write, and process instructions and data to direct packets through the network system 100 and may include one or more hardware processing units (e.g., microprocessors). The network interface 124 is configured to receive, transmit, and route packets from the network system 100 under the direction of the processor 122. The QKD logic 126 is configured to enable the processor 122 to perform the techniques described herein to optimize the secure sharing of secret keys between endpoints (e.g., endpoints 110 and 115) connected to the network system 100.

The network system 100 also includes additional network elements, such as a router 130, a router 140, a router 150, and a router 160. In addition to connecting the endpoint 110 to the network system 100, the router 120 is connected to router 140 and router 160. The router 130 also connects the endpoint 110 to the network system 100, and the router 130 is further connected to the router 140. The router 140 is connected to the routers 120, 130 and 150. The routers 150 and 160 are both connected to each other and to the endpoint 115.

Figure 2:
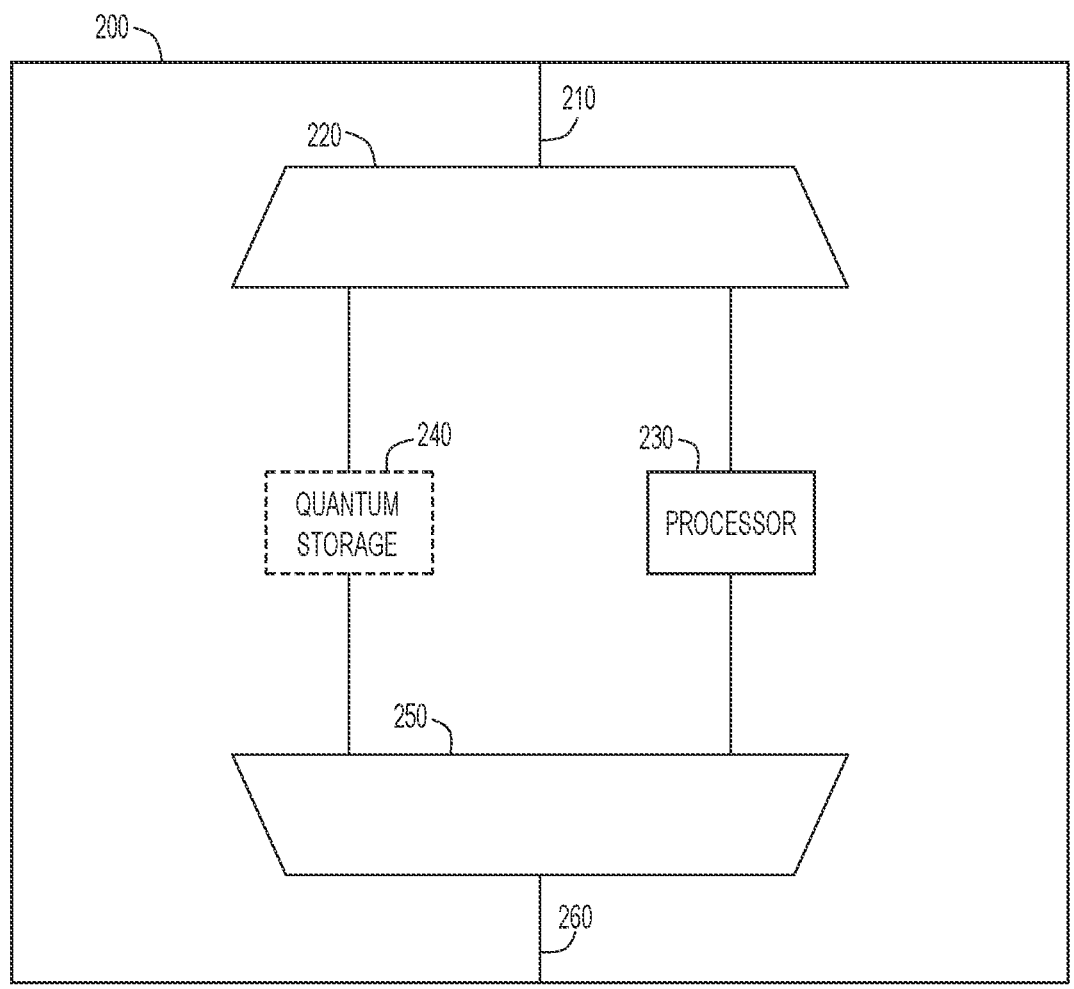
FIG. 2 is a simplified block diagram of a network element in a packet-switched hybrid quantum/classical network, according to an example embodiment.
Figure 3:
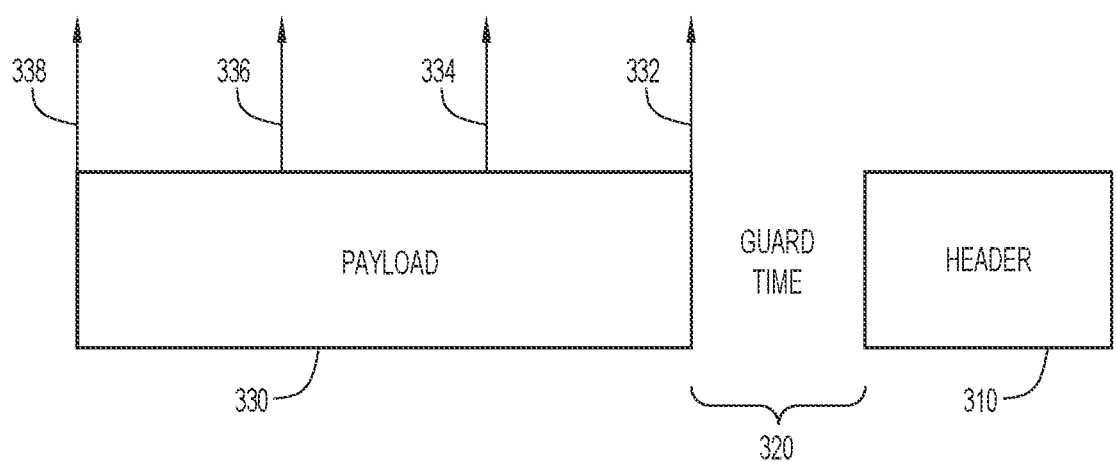
FIG. 3 illustrates a hybrid frame used in a packet-switched hybrid quantum/classical network for QKD, according to an example embodiment.

Referring now to FIG. 2, a simplified block diagram of a network element 200 (e.g., router 120) is shown. The network element 200 includes an input channel 210 that is configured to receive a hybrid packet with a classical header and a quantum payload, as shown in FIG. 3. The input channel 210 provides the packet to a separator 220 that separates the classical header from the quantum payload.

The network element 200 includes a processor 230 that is configured to process the classical header. The processor 230 may also regenerate the classical header with updated information (e.g., routing information, processing time information, etc.). The network element 200 may also include a quantum storage 240 that is configured to store the quantum payload while the processor 230 processes the classical header. The network element 200 includes a combiner 250 that is configured to combine the regenerated classical header with the stored quantum payload and update the hybrid packet. The combiner 250 provides the updated hybrid packet to an output channel 260 of the network element 200.

If the network element 200 does not include the quantum storage 240, then part of the quantum payload will be discarded. Based on the amount of time the processor 230 uses to process and update the classical header, the beginning of the quantum payload may reach the combiner 250 before the updated classical header reaches the combiner 250. The beginning of the quantum payload may be discarded when the updated classical header when the combiner 250 recombines the classical header with the quantum payload.

In one example, the quantum storage 240 may be a fiber loop for delaying quantum payloads of optical packets while the processor 230 processes the classical header. In this instance, an optimal storage time, i.e., length of fiber loop, may be determined based on the length of time the processor 230 takes to process the classical header. Alternatively, the quantum storage 240 may convert the form of the quantum payload, for instance from photon qubits to matter qubits (e.g., spin-based qubits) for storage.

In another example, the processor 230 may operate on the classical header to determine a next hop for the hybrid packet, e.g., by obtaining a network address for the destination endpoint of the hybrid packet. The processor 230 may also obtain additional information about the hybrid packet and/or other network elements in the network system 100 from the classical header. For instance, the classical header may include information about the path through the network system 100, such as the number of hops or length of time spent processing the hybrid packet at each hop. The processor 230 may also record the length of time the quantum payload is stored in the quantum storage 240.

The processor 230 may also be configured to use the classical header as a feedback control signal to compensate for systemic distortion (e.g., channel-induced polarization rotation) on the quantum payload. In other words, the processor 230 may detect a distortion in the classical header signal and compensate for the same distortion in the quantum payload without measuring the quantum payload.

In another example, the separator 220 may be an optical demultiplexer, a beam splitter, or an optical switch. Similarly, the combiner 250 may be an optical multiplexer, a beam splitter, or an optical switch. The separator 220 may be configured as a demultiplexer or switch to direct only the classical header to the processor 230 and only the quantum payload to the quantum storage 240 or combiner 250. Alternatively, the separator 220 may be configured as a beam splitter (e.g., a 90/10 beamsplitter) to send the entire hybrid packet at a reduced intensity to the processor 230 and the combiner 250, optionally through the quantum storage 240. For instance, the separator 220 may direct a relatively low intensity (e.g., 10% of the full intensity) photonic packet to the processor 230, since the processor can amplify the classical header to obtain the information in the classical portion of the header. The relatively high intensity (e.g., 90% of the full intensity) photonic packet may be directed to the quantum storage 240 or the combiner 250 to preserve the intensity of the quantum payload, which cannot be directly amplified like classical signals.

Referring now to FIG. 3, an example structure of a hybrid packet 300 is shown. The hybrid packet 300 includes a classical header 310 followed by a guard time 320 that separates the classical header 310 from the quantum payload 330. The quantum payload 330 includes references pulses 332, 334, 336, and 338 for synchronization. In one example, the quantum payload 330 may include QKD signals, such as weak coherent pulses. The reference pulses 332, 334, 336, and 338 may be stronger pulses used for carrier recovery in Continuous Variable QKD (CV-QKD). If the hybrid packet 300 is processed by a network element that includes a quantum memory storage, then the qubits of the quantum payload 330 may be handled separately from the reference pulses 332, 334, 336, and 338 to preserve the coherence of the qubits in the quantum payload 330.

In another example, the classical header 310 may include routing information, such as source address, destination address, and/or routing history of network elements. The classical header 310 may also include information about the quantum payload 330. For instance, the classical header 310 may include an indication of the total amount of time the quantum payload 330 has been stored, which may be used in a routing strategy. As an example of a routing strategy, if the classical header 310 indicates that the quantum payload 330 has been stored for a length of time beyond a predetermined length of time (e.g., based on the likelihood of decoherence in the quantum payload), then the hybrid packet 300 may be dropped to avoid using additional resources on a packet that will not provide useful qubits for QKD.

The information about the quantum payload 330 stored in the classical header 310 may also include information on the amount and location of data that has been previously discarded from the quantum payload 330, as will be discussed with respect to FIG. 4A and FIG. 4B. For instance, the classical header 310 may indicate that a certain length of time has been dropped from the front of the quantum payload 330 to account for the time that previous network elements have spent processing and updating the classical header 310. The classical header 310 may also include additional information about the quantum payload 330, such as the transmission frequency, the payload length (e.g., in time), and the number of qubits generated for a QKD exchange.

Figure 4A:
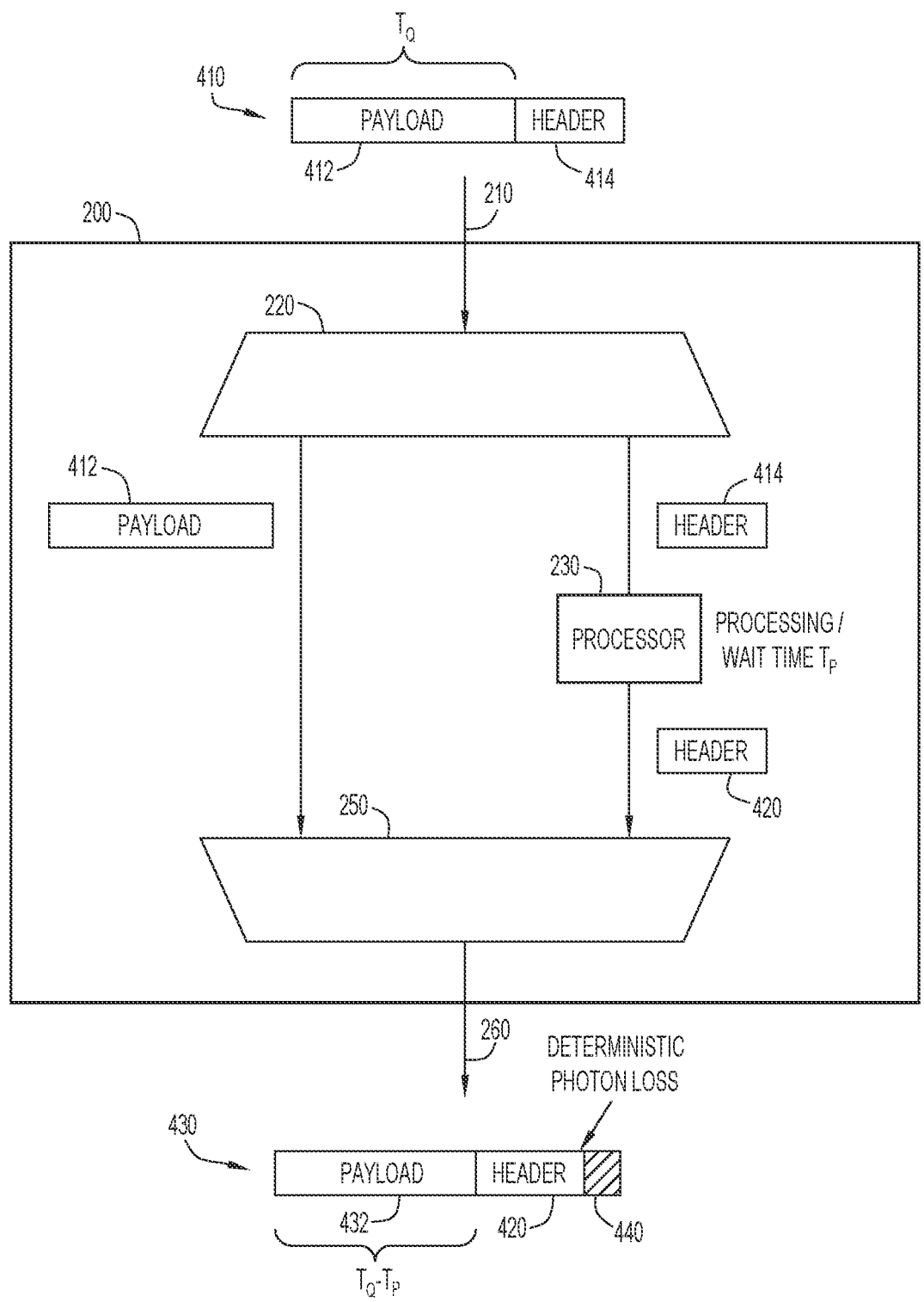
FIG. 4A illustrates one example for routing a hybrid frame for QKD through a network element without quantum storage, according to an example embodiment.

Referring now to FIG. 4A, an example of a network element 200 handling a hybrid packet 410 without quantum storage. The hybrid packet 410 includes a payload 412 and a header 414. In one example, the header 414 may include a guard time analogous to the guard time 320 shown in FIG. 3. When the hybrid packet 410 reaches the network element 200, the payload 412 has a length of $T_Q$.

The separator 220 directs the quantum payload 412 to the combiner 250 and directs the header 414 to the processor 230. The processor 230 spends an amount of time, $T_P$, to process the header 414 and obtain information about the hybrid packet 410. After processing the header 414, the processor 230 generates an updated header 420 based on routing decisions from the information obtained from the original header 414. For instance, the header 420 may include a network address of the next hop network element in a path to the destination endpoint.

The combiner 250 has to wait for the length of time $T_P$ spent processing the header 414 before having the components to generate un updated hybrid packet 430. The combiner 250 drops that length of time $T_P$ from the beginning of the payload 412 and combines the remaining payload 432 with the updated header 420 to generate the updated hybrid packet 430. The remaining payload 432 has a length of $(T_Q - T_P)$, i.e., the length of the original payload 412, To, without the time $T_P$ spent processing the header 414.

Since the lost payload portion 440 is dropped from the beginning of the payload 412, the location of the lost qubits is deterministic. The deterministic loss portion 440 may be an acceptable loss for QKD as long as a sufficient number of qubits reach the destination endpoint to generate cryptographically secure key bits. In other words, dropping some of the payload at each hop along the path from the source endpoint to the destination point may not prevent the endpoints from successfully determining secure cryptographic keys.

In one example, the length of the deterministic loss portion 440 may be mitigated by lowering a guard time between the header 420 and the payload 432. For instance, the processor 230 may determine that a shorter guard time is sufficient for the hybrid packet 430 to reach the destination endpoint if the routing information obtained from the header 414 indicates that the destination endpoint is only one hop away from the network element 200. The processor 230 may balance the effect of shortening the payload 432 or the guard time between the payload 432 and the header 420 based on the effect on the QKD protocol.

Figure 4B:
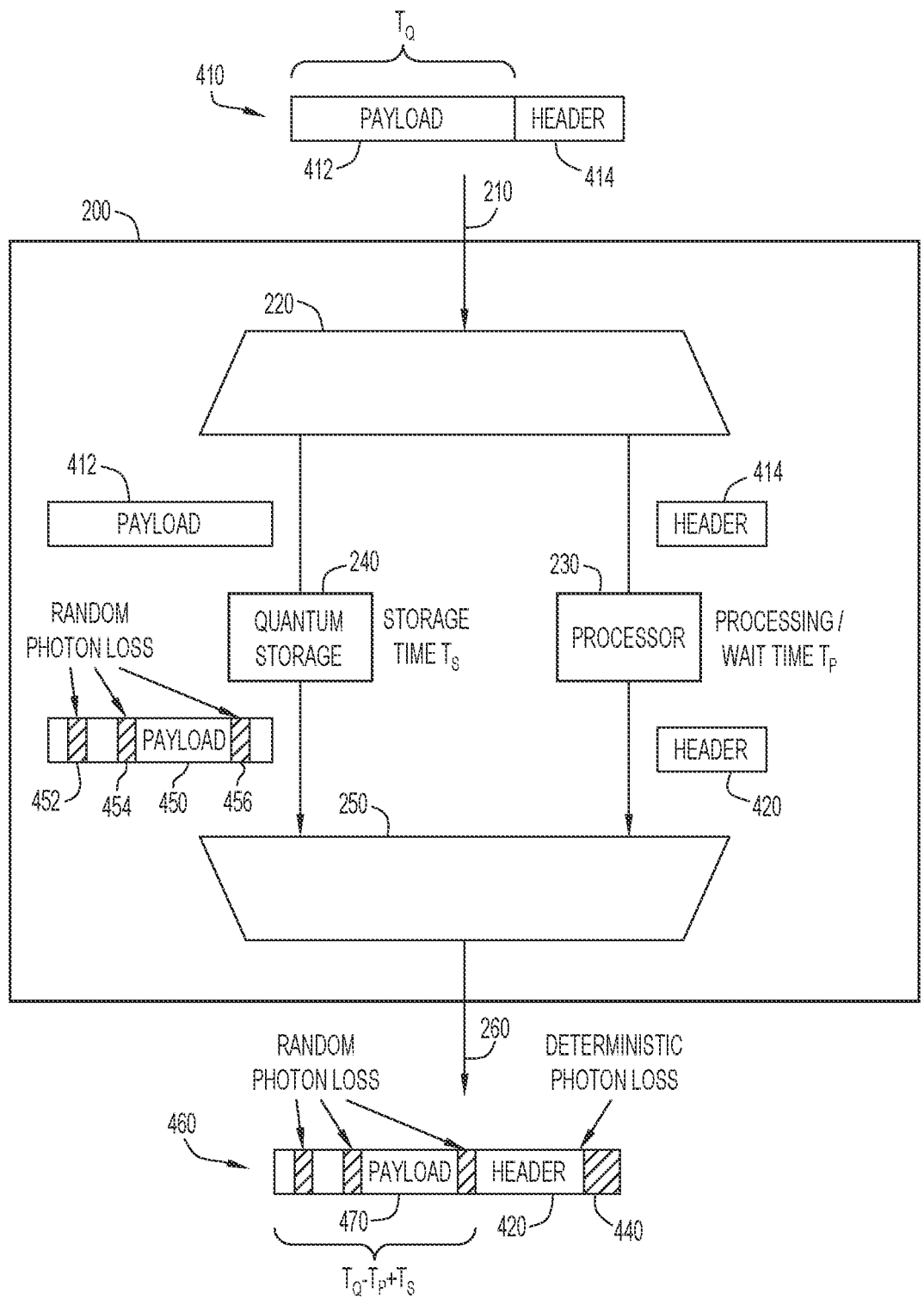
FIG. 4B illustrates one example for routing a hybrid frame for QKD through a network element with quantum storage, according to an example embodiment.

Referring now to FIG. 4B, an example of a network element 200 handling a hybrid packet 410 with quantum storage to mitigate losing payload qubits from the payload 412 while processing the header 414. The header 414 may include a guard time analogous to the guard time 320 shown in FIG. 3. When the hybrid packet 410 reaches the network element 200, the payload 412 has a length of $T_Q$.

The separator 220 directs the quantum payload 412 to the quantum storage 240 and directs the header 414 to the processor 230. The processor 230 spends an amount of time, $T_P$, to process the header 414 and obtain information about the hybrid packet 410. After processing the header 414, the processor 230 generates an updated header 420 based on routing decisions from the information obtained from the original header 414. For instance, the header 420 may include a network address of the next hop network element in a path to the destination endpoint.

While the processor 230 is processing the header 414 and generating the updated header 420, the payload 412 is stored in the quantum storage 240 for a storage time $T_S$. The quantum storage 240 may introduce some loss to the payload 412, and the quantum storage 240 may provide a payload 450 with portions 452, 454, and 456 that are lost, e.g., to impurities in the quantum storage 240. For instance, the quantum storage 240 may be an optical fiber loop that extends the path length between the separator 220 and the combiner 250. The optical fiber loop of the quantum storage 240 may introduce a loss component, which may affect the portions 452, 454, and 456 of the output payload 450 of the quantum storage 240.

In one example, storing the payload 412 allows time for the processor 230 to generate the updated header 420, such that the updated header 420 and the payload 450 arrive at the combiner 250 with less overlap than the payload 412 and the updated header 420 shown in FIG. 4A. The combiner 250 combines the payload 450 and the updated header 420 to generate an updated hybrid packet 460. The payload 470 of the hybrid packet 460 has a length $T_Q$ that is shortened by the processing time $T_P$, but extended by up to the storage time $T_S$. In other words, the length of the payload 470 is $T_Q - T_P + T_S$. The payload 470 will include at least some of the random loss portions 452, 454, and 456 generated by the quantum storage 240.

Depending on the relative length of the storage time $T_S$ in comparison to the processing time $T_P$, the updated header 420 may still overlap with the payload 450, leading the combiner 250 to drop the deterministic loss portion 440 from the beginning of the payload 450 when generating the hybrid packet 460. If the storage time $T_S$ is at least as long as the processing time $T_P$, then the hybrid packet 460 may not include at deterministic loss at all, since the payload 412 is stored for longer than necessary to process the header 414. However, increasing the storage time $T_S$ may result in an unacceptable number of random loss portions (e.g., portions 452, 454, and 456). The value of the storage time $T_S$ may be adjusted to optimize the rate at which the source endpoint and the destination endpoint can generate secret key material.

As with the network element 200 shown in FIG. 4A, the processor 230 may reduce a guard time between the header 420 and the payload 470 to minimize the deterministic loss portion 440. For instance, the processor 230 may determine that a shorter guard time is sufficient for the hybrid packet 460 to reach the destination endpoint if the routing information obtained from the header 414 indicates that the destination endpoint is only one hop away from the network element 200. The processor 230 may balance the effects of shortening the payload 470 or the guard time between the payload 470 and the header 420 based on the effect on the QKD protocol.

In another example, the processor 230 may discard hybrid packets (e.g., hybrid packet 410) based on information obtained from the header 414, such as the current queueing time or expected total queueing time in the network. For instance, the header 414 may include an indication of the time that the quantum payload was first generated, enabling the processor 230 to determine the total length of time that the hybrid packet has been travelling through the network. The processor 230 may also obtain live network statistics from other network elements in the network and estimate a total queueing time expected for the hybrid packet to reach the destination endpoint. Each network element in the network may broadcast the local traffic rate to provide the data for each network element to estimate the queueing time at every other network element in the network.

If the processor 230 determines that either the current queueing time or the expected queueing time exceeds a respective predetermined threshold, then the processor 230 may drop the hybrid packet 410 without further processing. The predetermined threshold for discarding packets may be fixed and specific to each pair of source endpoint and destination endpoint. By dropping packets as soon as any network element determines that the quantum payload is not likely to provide useful qubits for QKD, the network avoids congestion and reduces the time that other hybrid packets spend in memory. Conserving network resources for hybrid packets that have a lower estimated queueing time mitigates loss and noise to the QKD signals.

In a further example, a network simulation tool may determine QKD channel statistics for a network implementing the routing protocol described herein. The network simulation tool may generate a QKD metric that may be used at each network element to optimize and predict the secure key rate in a packet-switched QKD network. The QKD metric may quantify a probability that a particular hybrid packet will generate a minimum level of secret key material (e.g., a minimum number of secret bits). The routing protocol may increase the secure key rate by rejecting quantum bits with a queueing time above a predetermined threshold, by discarding "bad" frames (e.g., with long queueing time) as soon as possible along their path, and/or by disabling the detectors at the receiver endpoint when "bad" frames arrive.

Figure 5:
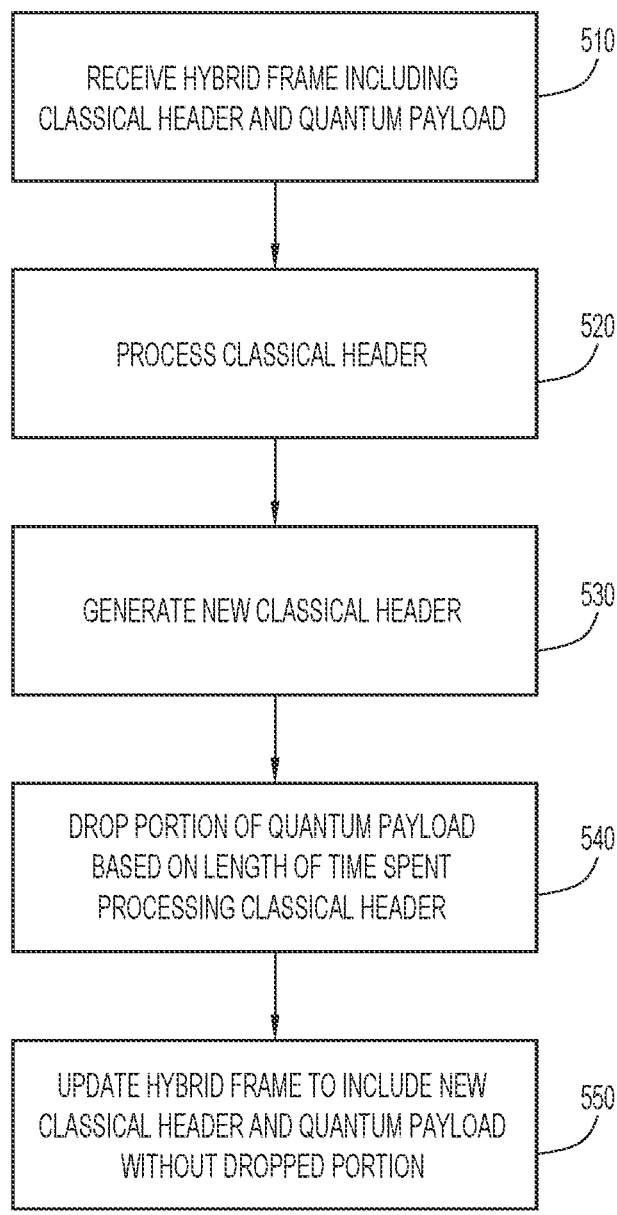
FIG. 5 is a flowchart illustrating operations performed by a network element to process a hybrid frame with a classical header and a quantum payload for QKD, according to an example embodiment.

Referring now to FIG. 5, a flowchart illustrates an example process 500 performed by a network element (e.g., router 120 or network element 200) to process and route a hybrid frame for QKD. At 510, the network element receives a hybrid frame that includes a classical header and a quantum payload. In one example, the hybrid frame may be an optical frame with a high intensity classical header and a low intensity or single photon qubits in the quantum payload. The qubits in the quantum payload may be Continuous Variable (CV) or Discrete Variable (DV) qubits. In another example, the quantum payload may include higher intensity synchronization pulses that enable time synchronization when processing the hybrid frame.

At 520, the network element processes the classical header to obtain routing information. In one example, the classical header may include a source network address and a destination network address to assist the network element with determining a routing path for the hybrid frame. In another example, the classical header may include information about the quantum payload that may be used in the routing protocol for QKD. For instance, the classical header may include an indication of the length of time since the quantum payload was generated to enable the network element to determine whether a sufficient number of qubits will remain coherent through the network to the destination endpoint. Additionally, the classical header may indicate any qubits in the quantum payload that have been dropped by previous network elements along the network path. In another example, the classical header may include information related to the timing of the hybrid frame, such as the length of guard time between the classical header and the beginning of the quantum payload.

At 530, the network element generates a new classical header to update the hybrid frame. In one example, the network element may include a next hop network address in the classical header. Additionally, the network element may include an indication of the length of time the quantum payload has spent in quantum storage at the network element. Alternatively, the network element may include an indication of the total time since the quantum payload was generated.

At 540, the network element drops a portion of the quantum payload based on the length of time spent processing the classical header. In one example, the network element may drop a time segment from the beginning of the quantum payload up to the length of time that the network element spent processing the classical header. In another example, the network element may drop lost portions of the quantum payload distributed throughout the quantum payload based on a length of time that the quantum payload spent in quantum storage while the network element processed the classical header. In a further example, if the output channel of the network element is occupied, then the network element may drop an additional portion of the payload based on a duration of time spent waiting for the output channel to be available to transmit the hybrid frame.

At 550, the network element updates the hybrid frame to include the new classical header and the quantum payload without the dropped portion. In one example, the network element may transmit the hybrid frame to the next hop along the network path from the source endpoint to the destination endpoint. Alternatively, the network element may completely drop the hybrid frame based on information from the classical header. For instance, if the network element determines that the total time spent processing the classical header at each header exceeds a predetermined threshold, then the network element may drop the hybrid frame due to the limited utility that the hybrid frame would provide for QKD at the destination endpoint.

Figure 6:
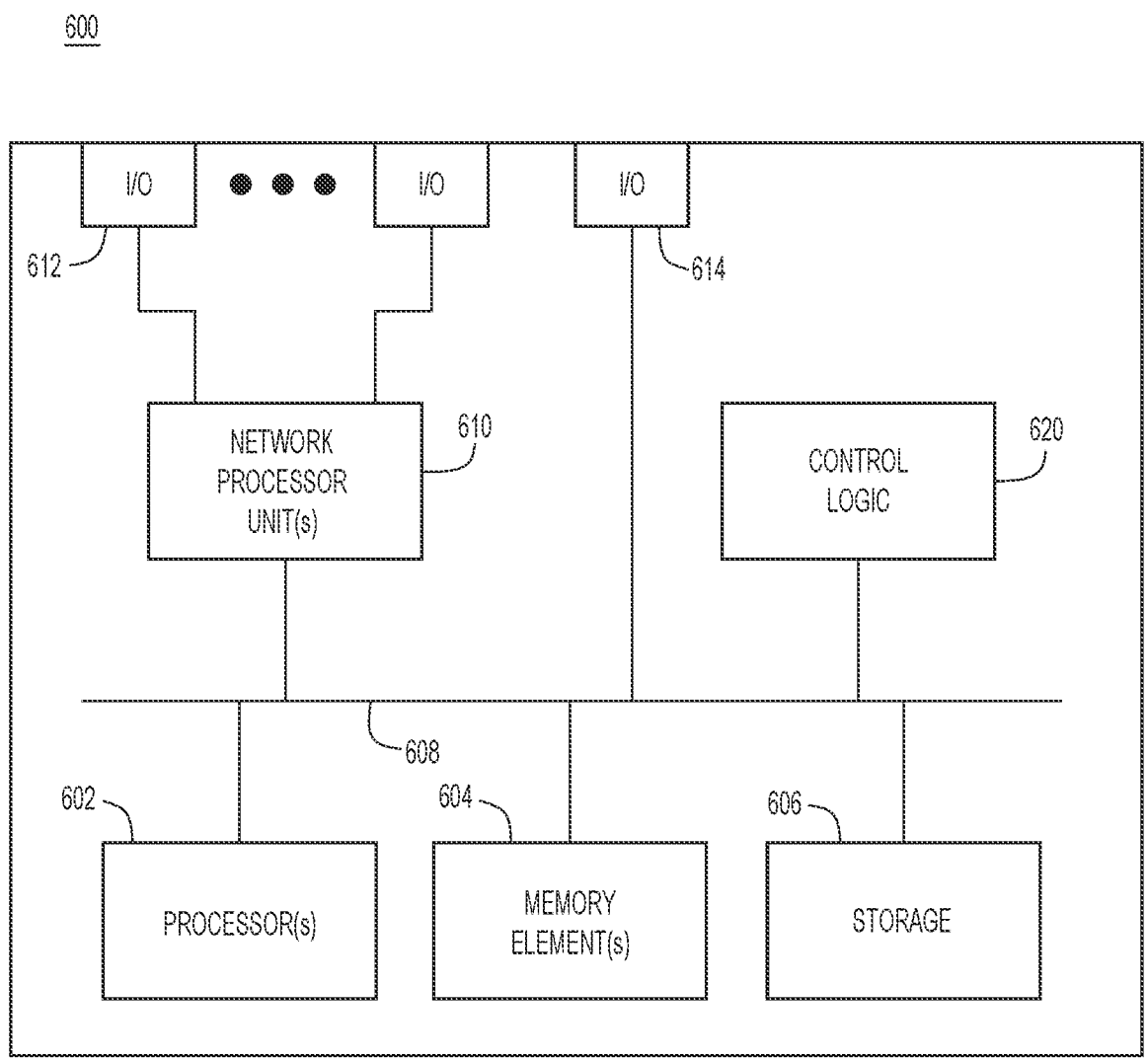
FIG. 6 is a block diagram of a computing device that may be configured to perform the techniques presented herein, according to an example embodiment.

Referring to FIG. 6, FIG. 6 illustrates a hardware block diagram of a computing device 600 that may perform functions associated with operations discussed herein in connection with the techniques depicted in FIGS. 1-3, 4A, 4B, and 5. In various embodiments, a computing device, such as computing device 600 or any combination of computing devices 600, may be configured as any entity/entities as discussed for the techniques depicted in connection with FIGS. 1-3, 4A, 4B, and 5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information, classical bits, qubits) from one state or thing to another state or thing. Any of potential classical processing elements, quantum processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store quantum data, classical data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a classical network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include a portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store classical data/information or quantum data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), light quantum memory, solid quantum memory, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store classical data, quantum data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In summary, the techniques presented herein enable packet-switched QKD for secure key distribution. Each network element along the path between the source endpoint and the destination endpoint may drop some or all of the quantum payload based on the value of forwarding a hybrid frame to the next hop provides to the completion of QKD. Since QKD inherently includes resilience to losing qubits between the source endpoint and the destination endpoint, dropping portions of any specific hybrid frame does not require the hybrid frame to be resent. The network conserves resources by avoiding the signaling typically associated with resending packets if they are lost. Each network element may implement a routing protocol, e.g., a determination to drop some or all of each hybrid frame, based on the utility of the hybrid frame to the generation of QKD secret key material between the source endpoint and the destination endpoint.

Additionally, the techniques presented herein provide flexibility to implement packet-switched QKD with different levels of quantum technology, such as quantum storage with different levels of efficiency or without any quantum storage at all. The techniques presented herein seamlessly adapt to take advantage of improved components as the technology improves. For instance, if quantum storage improves in efficiency or processing speed increases, then the network element may shift the balance between deterministic payload loss and random payload loss to optimize the QKD secret key generation rate.

In some aspects, the techniques described herein relate to a method including: receiving a hybrid frame at a router in a quantum network, the hybrid frame including a classical header and a quantum payload; processing the classical header for a length of time; generating a new classical header; dropping a portion of the quantum payload based on the length of time spent processing the classical header; and updating the hybrid frame to include the new classical header and the quantum payload without the dropped portion.

In some aspects, the techniques described herein relate to a method, further including responsive to a determination that the quantum payload exceeds a predetermined threshold, transmitting the hybrid frame to a next hop in the quantum network.

In some aspects, the techniques described herein relate to a method, wherein the predetermined threshold is based on the length of time spent processing the classical header.

In some aspects, the techniques described herein relate to a method, further including: obtaining one or more traffic indications from other routers in the quantum network; and estimating a total length of time for processing the classical header at a plurality of routers along a path in the quantum network between a source of the hybrid frame and a destination of the hybrid frame, wherein the predetermined threshold is based on the total length of time estimated for processing the classical header.

In some aspects, the techniques described herein relate to a method, further including generating a Quantum Key Distribution (QKD) metric that quantifies a probability that the hybrid frame will generate a minimum number of secret bits at a destination of the hybrid frame, wherein the predetermined threshold is based on the QKD metric.

In some aspects, the techniques described herein relate to a method, wherein the portion dropped from the quantum payload includes an initial portion dropped from a beginning of the quantum payload.

In some aspects, the techniques described herein relate to a method, further including storing the quantum payload while the classical header is processed, wherein the portion dropped from the quantum payload includes a random portion based on losses from storing the quantum payload.

In some aspects, the techniques described herein relate to a method, further including: determining that an output channel is occupied; and dropping an additional portion of the payload based on a duration of time waiting for the output channel to be ready to transmit the hybrid frame.

In some aspects, the techniques described herein relate to an apparatus including: a network interface configured to communicate with computing devices in a quantum network; and a processor configured to: receive a hybrid frame via the network interface, the hybrid frame including a classical header and a quantum payload; process the classical header for a length of time; generate a new classical header; drop a portion of the quantum payload based on the length of time spent processing the classical header; and update the hybrid frame to include the new classical header and the quantum payload without the dropped portion.

In some aspects, the techniques described herein relate to an apparatus, wherein the processor is further configured to cause the network interface to transmit the hybrid frame to a next hop in the quantum network, responsive to a determination that the quantum payload exceeds a predetermined threshold.

In some aspects, the techniques described herein relate to an apparatus, wherein the predetermined threshold is based on the length of time spent processing the classical header.

In some aspects, the techniques described herein relate to an apparatus, wherein the processor is further configured to: obtain one or more traffic indications from other routers in the quantum network; and estimate a total length of time for processing the classical header at a plurality of routers along a path in the quantum network between a source of the hybrid frame and a destination of the hybrid frame, wherein the predetermined threshold is based on the total length of time estimated for processing the classical header.

In some aspects, the techniques described herein relate to an apparatus, wherein the processor is further configured to generate a Quantum Key Distribution (QKD) metric that quantifies a probability that the hybrid frame will generate a minimum number of secret bits at a destination of the hybrid frame, wherein the predetermined threshold is based on the QKD metric.

In some aspects, the techniques described herein relate to an apparatus, wherein the portion dropped from the quantum payload includes an initial portion dropped from a beginning of the quantum payload.

In some aspects, the techniques described herein relate to an apparatus, further including a quantum storage device configured to store the quantum payload while the classical header is processed, wherein the portion dropped from the quantum payload includes a random portion based on losses from storing the quantum payload.

In some aspects, the techniques described herein relate to a system including: a plurality of routers in a quantum network, each router of the plurality of routers configured to: receive a hybrid frame including a classical header and a quantum payload; process the classical header for a length of time; generate a new classical header; drop a portion of the quantum payload based on the length of time spent processing the classical header; and update the hybrid frame to include the new classical header and the quantum payload without the dropped portion.

In some aspects, the techniques described herein relate to a system, wherein each router is further configured to transmit the hybrid frame to a next hop in the quantum network, responsive to a determination that the quantum payload exceeds a predetermined threshold.

In some aspects, the techniques described herein relate to a system, wherein the predetermined threshold is based on the length of time spent processing the classical header.

In some aspects, the techniques described herein relate to a system, wherein each router is further configured to: obtain one or more traffic indications from other routers in the quantum network; and estimate a total length of time for processing the classical header at a set of routers among the plurality of routers along a path in the quantum network between a source of the hybrid frame and a destination of the hybrid frame, wherein the predetermined threshold is based on the total length of time estimated for processing the classical header.

In some aspects, the techniques described herein relate to a system, wherein each router is further configured to generate a Quantum Key Distribution (QKD) metric that quantifies a probability that the hybrid frame will generate a minimum number of secret bits at a destination of the hybrid frame, wherein the predetermined threshold is based on the QKD metric. 21.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving a hybrid frame at a router in a quantum network, the hybrid frame including a classical header and a quantum payload;
processing the classical header for a length of time;
generating a new classical header;
dropping a portion of the quantum payload based on the length of time spent processing the classical header; and
updating the hybrid frame to include the new classical header and the quantum payload without the dropped portion.

2. The method of claim 1, further comprising responsive to a determination that the quantum payload exceeds a predetermined threshold, transmitting the hybrid frame to a next hop in the quantum network.

3. The method of claim 2, wherein the predetermined threshold is based on the length of time spent processing the classical header.

4. The method of claim 2, further comprising:
obtaining one or more traffic indications from other routers in the quantum network; and
estimating a total length of time for processing the classical header at a plurality of routers along a path in the quantum network between a source of the hybrid frame and a destination of the hybrid frame,
wherein the predetermined threshold is based on the total length of time estimated for processing the classical header.

5. The method of claim 2, further comprising generating a Quantum Key Distribution (QKD) metric that quantifies a probability that the hybrid frame will generate a minimum number of secret bits at a destination of the hybrid frame, wherein the predetermined threshold is based on the QKD metric.

6. The method of claim 1, wherein the portion dropped from the quantum payload includes an initial portion dropped from a beginning of the quantum payload.

7. The method of claim 1, further comprising storing the quantum payload while the classical header is processed, wherein the portion dropped from the quantum payload includes a random portion based on losses from storing the quantum payload.

8. The method of claim 1, further comprising:
determining that an output channel of the router is occupied; and
dropping an additional portion of the quantum payload based on a duration of time waiting for the output channel to be ready to transmit the hybrid frame.

9. An apparatus comprising:
a network interface configured to communicate with computing devices in a quantum network; and
a processor configured to:
receive a hybrid frame via the network interface, the hybrid frame including a classical header and a quantum payload;
process the classical header for a length of time;
generate a new classical header;
drop a portion of the quantum payload based on the length of time spent processing the classical header; and
update the hybrid frame to include the new classical header and the quantum payload without the dropped portion.

10. The apparatus of claim 9, wherein the processor is further configured to cause the network interface to transmit the hybrid frame to a next hop in the quantum network, responsive to a determination that the quantum payload exceeds a predetermined threshold.

11. The apparatus of claim 10, wherein the predetermined threshold is based on the length of time spent processing the classical header.

12. The apparatus of claim 10, wherein the processor is further configured to:
obtain one or more traffic indications from other routers in the quantum network; and
estimate a total length of time for processing the classical header at a plurality of routers along a path in the quantum network between a source of the hybrid frame and a destination of the hybrid frame,
wherein the predetermined threshold is based on the total length of time estimated for processing the classical header.

13. The apparatus of claim 10, wherein the processor is further configured to generate a Quantum Key Distribution (QKD) metric that quantifies a probability that the hybrid frame will generate a minimum number of secret bits at a destination of the hybrid frame, wherein the predetermined threshold is based on the QKD metric.

14. The apparatus of claim 9, wherein the portion dropped from the quantum payload includes an initial portion dropped from a beginning of the quantum payload.

15. The apparatus of claim 9, further comprising a quantum storage device configured to store the quantum payload while the classical header is processed, wherein the portion dropped from the quantum payload includes a random portion based on losses from storing the quantum payload.

16. A system comprising:
a plurality of routers in a quantum network, each router of the plurality of routers configured to:
receive a hybrid frame including a classical header and a quantum payload;
process the classical header for a length of time;
generate a new classical header;
drop a portion of the quantum payload based on the length of time spent processing the classical header; and
update the hybrid frame to include the new classical header and the quantum payload without the dropped portion.

17. The system of claim 16, wherein each router is further configured to transmit the hybrid frame to a next hop in the quantum network, responsive to a determination that the quantum payload exceeds a predetermined threshold.

18. The system of claim 17, wherein the predetermined threshold is based on the length of time spent processing the classical header.

19. The system of claim 17, wherein each router is further configured to:
obtain one or more traffic indications from other routers in the quantum network; and
estimate a total length of time for processing the classical header at a set of routers among the plurality of routers along a path in the quantum network between a source of the hybrid frame and a destination of the hybrid frame,
wherein the predetermined threshold is based on the total length of time estimated for processing the classical header.

20. The system of claim 17, wherein each router is further configured to generate a Quantum Key Distribution (QKD) metric that quantifies a probability that the hybrid frame will generate a minimum number of secret bits at a destination of the hybrid frame, wherein the predetermined threshold is based on the QKD metric.

\* \* \* \* \*